July 3, 1962 M. A. ORDORICA 3,042,133
INDEPENDENT WHEEL SUSPENSION
Filed Oct. 6, 1959 2 Sheets-Sheet 1
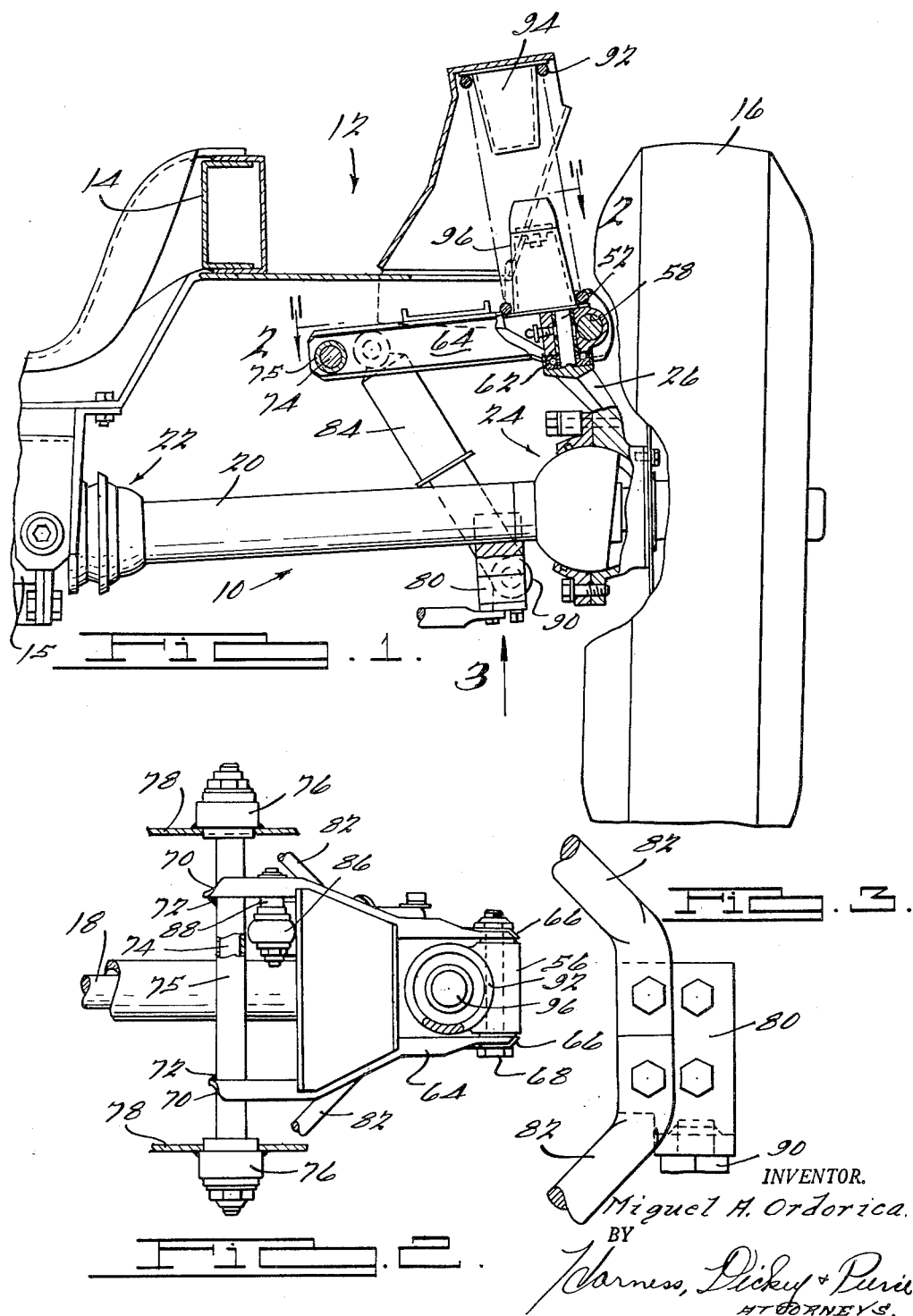
INVENTOR.
Miguel A. Ordorica.
BY
Harness, Dickey & Pierce
ATTORNEYS.

July 3, 1962    M. A. ORDORICA    3,042,133
INDEPENDENT WHEEL SUSPENSION
Filed Oct. 6, 1959    2 Sheets-Sheet 2

INVENTOR.
Miguel A. Ordorica.
BY
Harness, Dickey & Pierce.
ATTORNEYS.

United States Patent Office 3,042,133
Patented July 3, 1962

3,042,133
INDEPENDENT WHEEL SUSPENSION
Miguel A. Ordorica, Lambertville, Mich., assignor to Willys Motors, Inc., Toledo, Ohio, a corporation of Pennsylvania
Filed Oct. 6, 1959, Ser. No. 844,749
4 Claims. (Cl. 180—43)

This invention relates generally to automotive vehicles and more particularly to an independent wheel suspension mechanism for an automotive vehicle.

Independent wheel suspension is desirable in an automotive vehicle because the wheels are movable substantially independently of each other, thus improving the ride of the vehicle. It is also desirable in an independent suspension system to be able to utilize the drive shaft for a wheel as a suspension control arm to thereby reduce the number of suspension members and simplify the suspension mechanism. It is an object of this invention to utilize a housing for a wheel drive shaft as one of the suspension control arms in an independent suspension mechanism for that wheel. The joints in the housing are of hollow ball and socket type which are capable of retaining a lubricating fluid, thereby making it possible to use, in the drive shaft, small high capacity joints which must operate in lubricant.

A further object of this invention is to provide an independent suspension mechanism which is simple in construction, economical to manufacture and is applicable to steerable wheels.

Further objects, features and advantages of this invention will become apparent from a consideration of the following description, the appended claims and the accompanying drawing in which:

FIG. 1 is a fragmentary front view of a portion of the vehicle provided with the independent suspension mechanism of this invention;

FIG. 2 is a fragmentary sectional view looking substantially along the line 2—2 in FIG. 1;

FIG. 3 is an enlarged fragmentary bottom view of a portion of the independent suspension mechanism of this invention looking substantially in the direction of the arrow "3" in FIG. 1;

Figure 4:
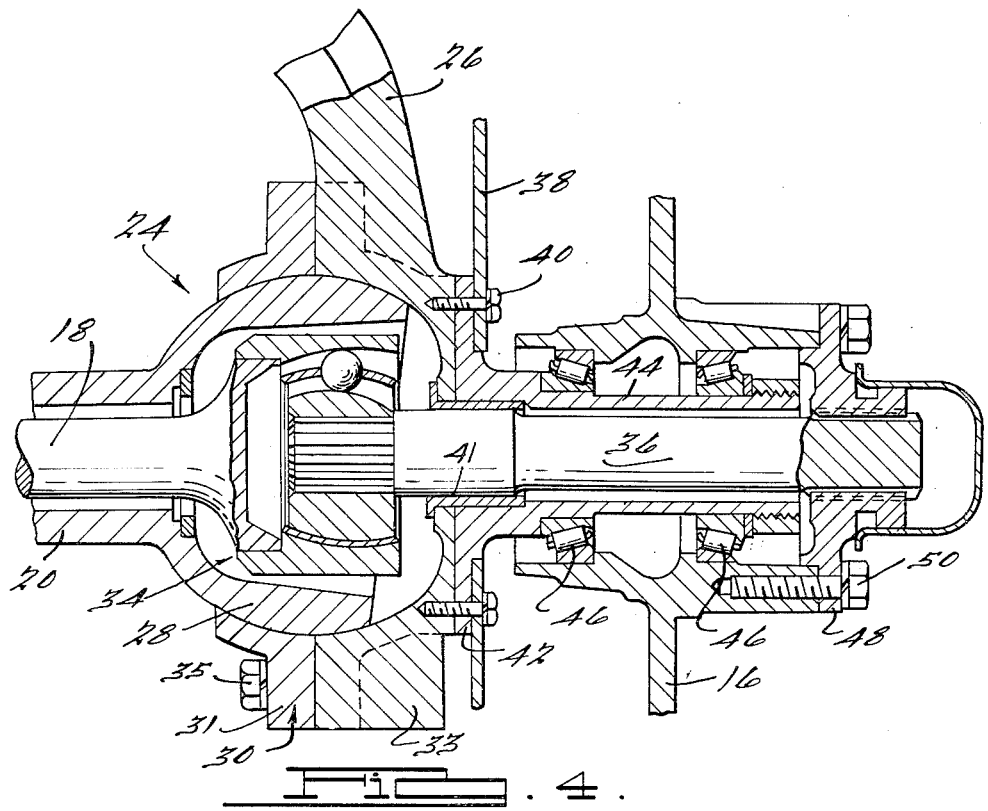
FIG. 4 is an enlarged vertical sectional view showing the assembly of the drive shaft, the driven wheel, and the housing for the drive shaft in the independent suspension mechanism of this invention.
Figure 5:
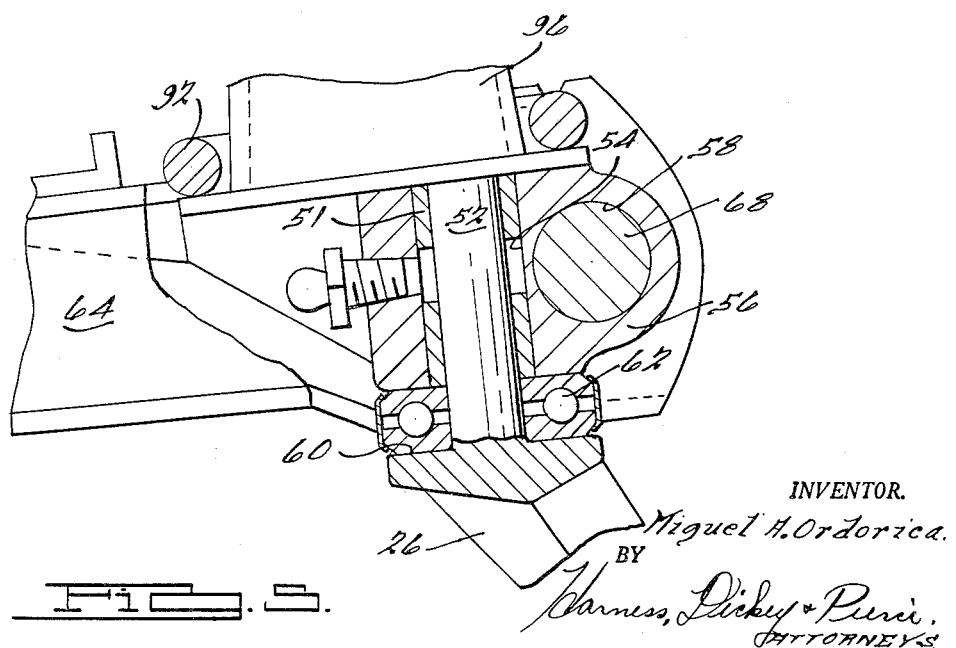
FIG. 5 is a fragmentary enlarged view of a portion of the suspension structure shown in FIG. 1.

With reference to the drawing, the wheel suspension mechanism of this invention, indicated generally at 10, is illustrated in FIG. 1 in assembly relation with a vehicle chassis 12 which includes a main frame 14 supported on a plurality of whels 16, only one of which is shown. The chassis 12 includes a final drive housing 15, only a portion of which is shown, carried by the frame 14 and a drive shaft 18, which is driven by the final drive mechanism in the housing 15, drives the wheel 16. An elongated housing 20 for the shaft 18 is connected at its inner end by a hollow ball and socket type joint 22 to the housing 15 and is connected at its outer end by a similar ball and socket type joint 24 to a knuckle 26.

Since the joints 22 and 24 are substantially identical, only the joint 24, which is illustrated in FIG. 4, is described in detail herein. The joint 24 consists of a ball member 28 formed on one end of the shaft housing 20 and a two-piece socket member 30 secured to the lower end of the knuckle 26. The socket member 30 consists of a pair of cooperating annular parts 31 and 33 connected by bolts 35. The ball and socket members 28 and 30 are arranged in a fluid tight relation so that the joint 24 can be filled with a lubricant. As a result, a small, high capacity type universal joint, of a constant velocity type, such as the "Rzeppa" joint indicated generally at 34, can be disposed in the joint 24 and assembled with the drive shaft 18 and a stub shaft 36 which drives the wheel 16. In mounting the wheel 16 so that it is driven by the shaft 36, a tubular spindle 44 having a radial end flange 42 is secured to the socket piece 33 and arranged in a supporting relation with a bushing 41 which in turn supports the stub shaft 36. Spaced roller bearings 46 on the spindle 44 rotatably support the wheel 16 which has the usual brake backing plate 38. Bolts 40 extend through the backing plate 38 and the flange 42 into the socket piece 33 to mount the wheel on the spindle and in turn secure the spindle to the socket 30. The outer end of the shaft 36 is spline connected to a hub member 48 which is secured by bolts 50 to the wheel 16.

The upper end of the knuckle 26, which is integral with the socket piece 33, is formed with a cylindrical shaft or spindle portion 52 which projects upwardly into an opening 54 formed in a body 56 which is also formed with an opening 58 that is substantialy horizontal and is to one side of the opening 54. The shaft portion 52 rotates within a bushing 51 in the opening 54. At the lower end of the shaft portion 52 the knuckle 56 is formed with a shoulder 60 which bears against a thrust bearing 62 which engages the underside of the body 56.

A suspension control arm 64, which is in the shape of an A-frame (FIG. 2), is formed at one end with a pair of spaced legs 66 which straddle the body 56. A bolt 68 extends through the legs 66 and the opening 58 in the body 56 pivotally supporting the body 56 on one end of the control arm 64. The opposite end of the control arm 64 is also formed with a pair of spaced legs 70 which are secured by welding 72 to longitudinally spaced portions of a tubular member 75 which is rotatably supported on an axially extending shaft 74 and in bearings 76 located at the ends of the tubular member 75 and carried by a pair of upright plates 78 which form a part of the main frame 14.

A bracket 80 is mounted on the shaft housing 20 at a position adjacent joint 24 and extends downwardly from the housing 20. A pair of radius arms 82 are secured at one of their ends to the bracket 80 and at their opposite ends (not shown) are pivotally connected to the main frame 14 for up and down swinging movement relative to the frame 14 at a position in line with the ball joint 22. The radius rods 82 prevent substantial fore and aft movement of the housing 20, and while two rods 82 are illustrated a single rod 82, which may or may not have its inner end positioned in line with the ball joint 22, is adequate.

A shock absorber assembly 84, of conventional type, has its upper end 86 mounted on a horizontal pivot 88 carried by one of the legs 70 on the control arm 64. The lower end 90 of the shock absorber assembly 84 is pivotally mounted on one side of the bracket 80.

In the use of the independent suspension mechanism 10, the wheel driving forces from the final drive housing 15 are transmitted to the shaft 18 and through the joint 34, which is preferably of constant velocity type, to the stub shaft 36 which drives the wheel 16. In the event the wheel 16 encounters a road obstruction which moves the wheel 16 upwardly, a spring 92 which is guidably supported at its upper end on a bracket 94 carried by the main frame 14 and is positioned at its lower end about a similar bracket 96 carried by the control arm 64, is compressed to yieldably resist the upward movement of the wheel 16. In the event the wheel 16 passes over a hole or cavity in the road surface so that it moves downwardly, the housing 20 pivots about the joint 22 and the control arm 64 pivots about the shaft 74. The spring 92 maintains the thrust bearing 62 in engagement with both the shoulder 60 and the underside of the body 56, and the shock absorber assembly 84 slows downward movement of the wheel 16. The shock transmitted to the wheel 16 when it hits the bottom of the road hole is cushioned by the shock absorber 84 and the spring 92 before being transmitted to the frame 14.

The control arm 64 and the housing 20 are substantially parallel and function as a parallel link mechanism to maintain the tread of the wheel 16 and the corresponding wheel on the opposite side of the vehicle substantially constant. During up and down movement of the wheel 16 relative to the frame 14, the body 56 pivots about the bolt 68 to prevent excessive scuffing of the wheel 16 on the road surface.

The wheel 16 is steered by a suitable linkage (not shown) connected to the steering knuckle 26. During steering of the wheel 16, the socket 30 moves about the bolt 28 and the shaft portion 52 at the upper end of the knuckle 26 rotates within the bushing 51 in the body 56.

It will be understood that the specific construction of the improved independent wheel suspension mechanism which is herein disclosed and described is presented for purposes of explanation and illustration and is not intended to indicate limits of the invention, the scope of which is defined by the following claims.

What is claimed is:

1. In an automotive vehicle having a main frame and ground wheels mounted on said frame, an independent wheel suspension mechanism for one of said wheels comprising a wheel supporting member, a housing for a drive shaft for said wheel extending inwardly of said vehicle, a ball and socket joint supporting said housing at its inner end on said main frame, a hollow ball and socket joint connecting the opposite end of said housing to said wheel supporting member, said last-named joint consisting of a ball member formed on the end of said housing and a socket member secured to said wheel supporting member, a steering knuckle secured to said socket member and extending upwardly therefrom, a suspension control arm arranged in a substantially parallel relation with said housing and pivotally supported at its inner end on said main frame, a body carried by the outer end of said control arm and engaged with said steering knuckle for pivotally supporting an upper portion thereof and applying a downwardly directed force thereto, spring means extending between said main frame and said control arm for applying a downwardly directed force thereto, radius rods connected to said main frame and to said housing, and a shock absorber assembly connected to and extending between said control arm and said housing.

2. The independent wheel suspension mechanism of claim 1 including an upwardly directed shaft portion being integral with and disposed at the terminus of the upper end of said steering knuckle and means on said body for supporting said shaft portion for rotation about the axis thereof.

3. The independent wheel suspension mechanism of claim 1 further including an upwardly directed shaft portion integral with and disposed at the terminus of the upper end of said steering knuckle, means on said body for supporting said shaft portion for rotation about the axis thereof, and a thrust bearing disposed about said shaft portion and arranged in bearing engagement with said body and said knuckle.

4. In a self-propelled steerable vehicle having a main frame and a plurality of ground wheels, an independent suspension mechanism for at least one of said wheels to be steered about a steering axis comprising: a shaft housing extending transversely of the vehicle and swivelly supported at its inner end on the main frame for up and down swinging movement and formed at its outer end with a hollow ball portion, a spindle assembly formed at its inner end with a socket portion engaging said hollow ball portion, said spindle assembly including a knuckle rigidly secured thereto and extending upwardly therefrom, a control arm disposed above and generally parallel to said shaft housing pivotally connected at its inner end to said frame, a body supported on the outer end of said control arm for rotational movement relative thereto about a substantially horizontal axis and engaged with said knuckle for applying a downwardly directed force thereto, said body having means supporting said knuckle at an upper portion thereof for pivotal movement about said steering axis, compression spring means extending between said frame and said body on said control arm whereby the movement of said spring means is substantially along a straight line, and a drive shaft for said wheel disposed in said housing.

References Cited in the file of this patent

UNITED STATES PATENTS

| 1,837,106 | Bucciali | Dec. 15, 1931 |
| 2,069,253 | Kliesrath | Feb. 2, 1937 |
| 2,290,923 | Wahlberg | July 28, 1942 |
| 2,477,090 | Roeder et al. | July 26, 1949 |
| 2,737,791 | Dillman et al. | Mar. 13, 1956 |
| 2,756,067 | Porsche et al. | July 24, 1956 |

FOREIGN PATENTS

| 875,503 | France | June 22, 1942 |
| 631,905 | Great Britain | Nov. 11, 1949 |